(12) United States Patent
Caseau

(10) Patent No.: US 7,426,267 B1
(45) Date of Patent: Sep. 16, 2008

(54) DECLARATIVE ACD ROUTING WITH SERVICE LEVEL OPTIMIZATION

(75) Inventor: Yves Jean Caseau, Versailles (FR)

(73) Assignee: Contactual, Inc., San Carlos, CA (US)

( * ) Notice: Subject to any disclaimer, the term of this patent is extended or adjusted under 35 U.S.C. 154(b) by 1040 days.

(21) Appl. No.: 10/656,577

(22) Filed: Sep. 4, 2003

(51) Int. Cl.
  *H04M 3/00* (2006.01)
(52) U.S. Cl. .......................... 379/265.02; 379/265.06; 379/265.07; 379/265.08; 379/265.1; 379/265.12
(58) Field of Classification Search ............ 379/265.02, 379/265.06, 265.07, 265.08, 265.1, 265.12, 379/266.01–266.1, 309
See application file for complete search history.

(56) References Cited

U.S. PATENT DOCUMENTS

| | | | | |
|---|---|---|---|---|
| 5,825,869 A | * | 10/1998 | Brooks et al. | 379/265.12 |
| 6,226,377 B1 | * | 5/2001 | Donaghue, Jr. | 379/265.13 |
| 7,010,115 B2 | * | 3/2006 | Dezonno et al. | 379/265.09 |
| 7,035,927 B2 | * | 4/2006 | Flockhart et al. | 709/225 |

FOREIGN PATENT DOCUMENTS

| | | |
|---|---|---|
| EP | 1 016 998 A2 | 5/2000 |
| WO | WO99/65214 | 12/1999 |

OTHER PUBLICATIONS

Benoist, Bourreau, Caseau, Rottembourg, Towards Stochastic Constraint Programming: A Study of On-Line Multi-Choice Knapsack with Deadlines, Proceedings of CP'2001, 2001.

* cited by examiner

*Primary Examiner*—William J Deane
(74) *Attorney, Agent, or Firm*—NewTechLaw; Gerald B. Rosenberg, Esq.

(57) ABSTRACT

A method including determining a current rate of satisfying a service level agreement constraint, wherein the service level agreement constraint is associated to selected ones of each incoming contact within a contact center, comparing the current rate to a target rate associated with the service level agreement constraint to calculate a satisfaction value, measuring a size of a queue associated with the service level agreement constraint, and calculating a potential value associated with the service level agreement constraint based on the satisfaction value, the queue size and a weighted priority level associated with the service level agreement constraint.

40 Claims, 3 Drawing Sheets

DECLARATIVE ACD ROUTING WITH SERVICE LEVEL OPTIMIZATION

FIELD OF THE INVENTION

The present invention relates to routing multimedia sessions within an automatic call distributor. More particularly, this invention relates to routing multimedia sessions using declarative automatic call distributor routing with service level optimization.

BACKGROUND OF THE INVENTION

A contact center is defined as a set of queues, onto which "calls" arrive, which may be phone calls, video calls, email, chat messages, instant messages and the like, and by a set of agents, who may answer the calls in some of the queues. Calls are stored in multiple queues for two reasons. On the one hand, by associating the right agents to each queue, the handling of each call can be optimized both in quality and in time. Therefore, a skill level is often associated to each pair, the agent and the queue, that is used to optimize this agent-to-call matching. On the other hand, calls are also separated into different queues to ensure different qualities of service depending on the expected value of the call from the company's (owner/operator of the contact center) point of view. The quality of service is defined by one or more service level agreements (SLA) that specify that a given percentage of the calls must be answered within so many seconds. Using these two requirements, it is common to assign agents to queues in order to optimize the handling of calls and to ensure the relative independence of the quality of service. However, a direct application of queuing theory shows that the efficiency of the contact center, measured by its throughput (number of calls answered per hour), is maximized by allowing agents to work on as many queues as possible. A multi-skilled workforce is more flexible, thus the idle time that is necessary to reach a given quality of service is reduced.

The dilemma to solve when routing calls is, therefore, to allow the flexibility and the throughput of a multi-skilled contact center, while ensuring the independence between the queues from a service level agreement point of view. This is a difficult problem because automatic call distribution (ACD) routing falls into the domain of on-line algorithms. Practical on-line algorithms are difficult to develop for many reasons. First, real world event distributions are regular but hard to predict. In the case of a contact center, this means that the call distribution can be characterized but the standard deviation is high. Moreover, the multi-skill aspect adds a combinatorial nature to the routing problem. Combinatorial stochastic problems are tricky because the combinational aspect yields a non-linearity that invalidates most statistical analysis techniques and produces a chaotic behavior.

Real world ACD routing algorithms use dynamic heuristics and simple, rule-based selection of calls and agents. Queues and calls may be assigned priorities, which are taken into account by the selection rules, among many other criteria such as skill level, priority and arrival time. In a multi-skill environment, finding the right number of agents for each queue, referred to as dimensioning, is done through simulation, and the weights may be finely tuned to obtained the desired SLAs. However, the variability of the problem makes this tuning quite difficult. Classic heuristics, such as first-fit and best-fit, do not provide the flexibility to guide routing based on SLAs. Using a first-fit process, when a new call arrives, or when an agent becomes available, the algorithm polls each queue until a match is found. The first match is returned. Best-fit is similar to first-fit, except that all matches are considered and the best one is returned. A commonly used heuristic for best-fit is to return the least qualified agents for a new call, and the most urgent call for a newly freed agent. Using the least qualified agents, as based on the agent's queue list and the agent's skill levels, maximizes the probability that another call may be handled by a more qualified agent later.

A solution has been proposed called service level routing (SLR). SLR routes calls according to SLAs by dynamically adjusting the size of the group of agents that can work on a given queue based on the current SLA satisfaction. A manner of implementing SLR is to sort a list of agents from less flexible to most flexible for each queue, and the most flexible agents may be temporarily removed from the list when other queues have more stringent SLAs. Where SLR is effective in meeting constraints associated with SLAs, there is a trade-off between meeting the SLAs and throughput of the contact center. By focusing primarily on meeting SLAs, SLR often suffers from reduced throughput.

It is desirable to control the routing algorithm by only stating the SLAs. Such a situation is referred to as declarative control. One method of implementing declarative control is reactive stochastic planning (RSP). RSP uses a planner to maintain a schedule that mixes the existing calls in the queues and forecasted future calls. This schedule is maintained regularly and is used to guide a best-fit algorithm that tries to reproduce what is forecasted in the schedule. This is a sophisticated method of implementing a reservation mechanism. Unfortunately, RSP plans for a worst case future that rarely, if ever, occurs in practice. As a result, resources can periodically be mis-allocated using RSP.

What is needed is an improved method of routing calls within a contact center by stating the service level agreements. What is also needed is a method of improving throughput of the contact center while meeting the service level agreements.

SUMMARY OF THE INVENTION

An embodiment of the present invention includes a method of determining a current rate of satisfying a service level agreement constraint, wherein the service level agreement constraint is associated to selected ones of each incoming contact within a contact center, comparing the current rate to a target rate associated with the service level agreement constraint to calculate a satisfaction value, measuring a size of a queue associated with the service level agreement constraint, and calculating a potential value associated with the service level agreement constraint based on the satisfaction value, the queue size and a weighted priority level associated with the service level agreement constraint. The contact center includes one or more agents and one or more queues such that each service level agreement constraint is associated to one of the queues, and each agent is associated with one or more of the queues. Preferably, a skill level is associated to each agent for each queue, a skill level is associated to each contact, and a skill constraint is associated to each queue such that each contact is answered by an agent with skill level equal to or greater than the skill level associated with the contact. After a predetermined time frame, if the contact is not answered by an agent, then the skill constraint associated with the contact can be by-passed.

The method can also include calculating a potential value associated with one of the one or more queues by summing the potential values of all service level agreement constraints associated with the queue. The method can also include signaling that an agent is available, sorting a list of queues associated with the available agent according to the potential energies of the queues, selecting a non-empty queue with the highest potential energy from the list, and routing a first contact in the selected queue to the available agent. The first contact can be determined by which contact arrived in the selected queue first. The first contact can be determined by selecting a contact from the selected queue that minimizes a combination of delay and a contact priority weight. The method can also include calculating a potential value associated with one of the one or more agents by summing the potential values of all queues associated with the agent. The method can also include associating a new incoming contact to a queue, sorting a list of agents associated to the queue according to the potential energies of the agents, and routing the contact to an available agent on the list with the lowest potential energy. The method can also include routing the contact to the queue if no agents on the list are available. The method can also include placing the contact on hold and associating a wake-up time to the contact, awakening the contact after the wake-up time has elapsed, and routing the contact to an available agent with the lowest potential energy.

The satisfaction value is preferably calculated by a discontinuous functional relationship between the current rate and the target rate. The functional relationship is preferably defined by: $f(a,b)=(100+|a-b|)$, for $a \leq b$, and $f(a,b)=(|a-b|)/20$, for $a>b$, where a is the current rate and b is the target rate plus a tuning factor. The current rate is preferably determined by calculating the ratio of the sum of all contacts associated with the service level agreement constraint that were picked-up within a given past time frame and that satisfied the service level agreement constraint plus the sum of all contacts in the queue associated with the service level agreement constraint that can still satisfy the service level agreement constraint, and the sum of all contacts associated with the service level agreement constraint that were picked-up within the given past time frame plus the sum of all contacts in the queue associated with the service level agreement constraint. The potential value associated with the service level agreement constraint is preferably calculated by multiplying the weighted priority level associated with the contact and the sum of the queue size divided by a tuning factor plus the satisfaction value. The service level agreement constraint for each contact can be satisfied when the agent receives the contact within a predetermined pick-up time. The queue size can define the number of contacts within the queue that have yet to be picked-up by an agent associated with the queue. The contact can be one of a telephone call, a video call, an email, a chat message, and an instant message. The service level agreement constraint can include a pick-up time and the target rate.

DETAILED DESCRIPTION OF THE

EMBODIMENTS

Figure 1:
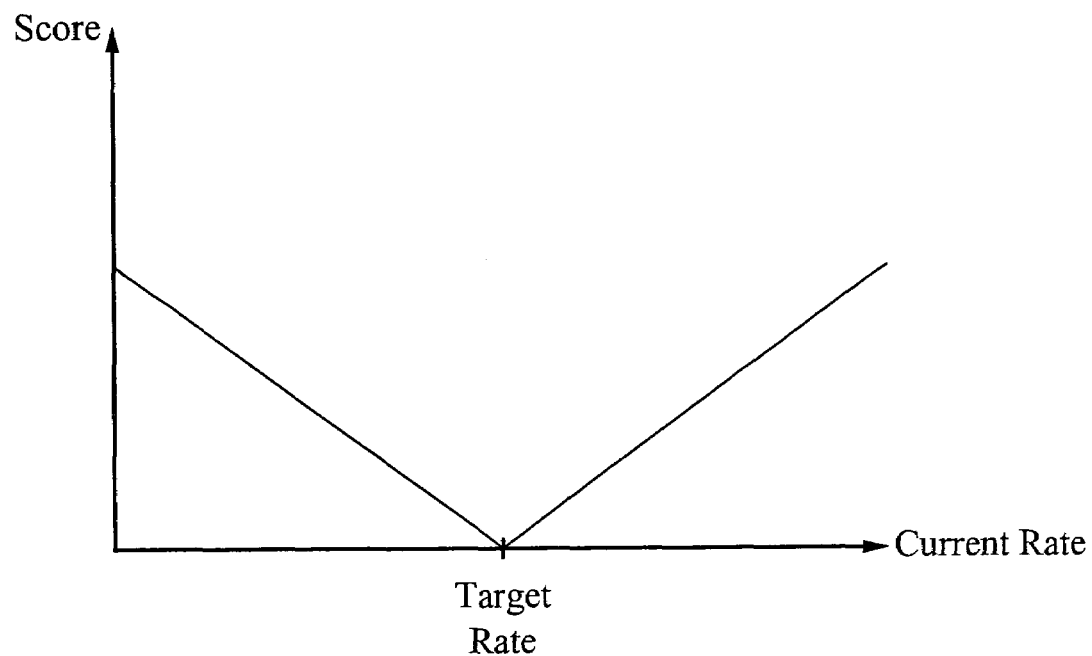
FIG. 1 illustrates a conventional function for scoring a comparison between a current rate and a target rate.

Embodiments of the present invention use a method called service level optimization, or SLO. SLO is a constraint-based heuristic that is based on the principle of a service level agreement (SLA). The SLO methodology is used in place of conventional call routing methodologies in an ACD to more efficiently provide high throughput while meeting SLAs. SLO makes routing decisions based on objects that represent the SLAs. Each SLA is an active constraint with a potential function that yields a dynamic priority for each queue and a potential value for each agent. When compared to conventional routing methods such as first-fit, best-fit, SLR and RSP, embodiments of the present invention can provide the same level of satisfaction using fewer agents, or can provide a higher level of satisfaction using the same number of agents.

The SLO methodology is preferably utilized in a multi-queued, multi-skill call center. A "call", or contact, can be multimedia in nature, such as a telephone call, a video call, an email, an instant message, or a chat message, and can also be considered a multimedia session. As such, the call center can also be referred to as a contact center. It is understood that other types of contact methods can be utilized by the present invention.

A call center includes an ACD for receiving and routing calls. Each call is routed to one of many queues where the queues are manned by a set of agents. To design a call center, all SLAs are first defined and then the ACD is tuned to meet the requirements of the SLAs. In the preferred embodiment, the ACD utilizes the SLO method to assign calls to agents and/or queues based a specific prioritization scheme. The SLO prioritization scheme is discussed in greater detail below.

Each queue is preferably assigned a different type of call, such as telephone call, email, or a chat message. The type of call can be further broken down based on the reason for the call, such as help desk, activation, or billing, each of which can be characterized by an anticipated processing time. Each type of call can also be characterized by its priority level, such as VIP or regular, as is preferably defined by the SLAs. As can be seen by the variety of possible queue types, the queues display various trade-offs, such as email versus telephone, long processing times versus short processing times, or VIP customers versus regular customers. Each queue is assigned one or many SLAs.

SLAs are preferably defined by two numbers, a pick-up time and a satisfaction target rate. For example, 80% of the calls, in this case email, are answered (picked-up) in less than 10 minutes, or 95% of telephone calls are answered in less than 20 minutes. Each SLA is also assigned a priority level. Preferably, there are three levels, low, medium, and high. The low level is assigned a value of 3, the medium level is assigned a value of 2, and the high level is assigned a value of 1. The value of each priority level is set according to the strategy of the company using the service of the ACD, based on the perceived value for each call. It is understood that more or less than three priority levels can be used and that the assigned value of each priority level can be any chosen value.

A call center is defined by a set of queues, onto which calls arrive, and by a set of agents, who answer calls in one or more queues. Each agent can be assigned to one or more queues. If the agent is only assigned to one queue, then that agent is said to be uni-skilled. If the agent is assigned to multiple queues, then that agent is said to be multi-skilled. Multi-skilled agents are more flexible than uni-skilled agents. The more flexible the agents, the more throughput of calls through the call center is possible. A skill level is associated to each agent for each queue and to each call, using a similar 3-valued notation as the SLA priority level (low, medium, and high). Preferably, a skill constraint is associated to each queue such that a call can only be answered by an agent with skill level equal to or higher than the skill level required for the call, until a given period has elapsed and no adequate agent is available, at which point the skill constraint is lifted.

The SLO methodology uses a dynamic routing algorithm based on a mathematical analysis of the SLA constraints. The mathematical analysis assigns a potential value, referred to as an energy value, to each of the SLAs. An energy value for each queue can be determined by summing the energy values of all SLAs associated with that particular queue. An energy value for each agent can also be determined by summing the energy values of each queue associated with that particular agent. Preferably, the higher the energy value, the worse the performance. Based on one or more of these calculated energy values, calls and agents can be dynamically allocated to efficiently meet the SLA constraints. The dynamic routing algorithm is essentially constraint-based where the constraints are defined by the SLAs. The constraints are considered active objects since the routing algorithm is able to evaluate how well each constraint is being met at any given time. Based on this dynamic evaluation, a score corresponding to a current energy value is generated for each SLA. With this score, the dynamic routing algorithm makes a determination as to which agent picks up a given call, or which queue a call is placed into.

The following notations are used in describing embodiments of the SLO method of the present invention:

---

$E = \{e_1, \ldots, e_x\}$ is a set of incoming call events; for each event e:
    e.date    the time at which the call arrived into the ACD, measured in seconds
    e.queue    the queue onto which the call is placed.
    e.skill    the skill level that is required for the call.
    e.priority    the priority level assigned to this call.
    e.pick    the time at which the call is initially picked-up by an agent.
$A = \{a_1, \ldots, a_m\}$ is a set of agents; for each agent a:
    a.queues    the set of queues that agent a can service.
    a.skill(q)    the skill level that is assigned to agent a for the queue q.
$Q = \{q_1, \ldots, q_n\}$ is a set of queues that can contain call events;
for each queue q:
    q.size    the current size of the queue q (the set of call events stored in the queue q).
$S = \{s_1, \ldots, s_p\}$ is a set of Service Level Agreements (SLA); for each SLA s:
    s.delay    the length of time before which the call is considered late.
    s.rate    the target rate of calls that are answered within s.delay.
    s.queue    the queue to which the SLA s applies.
    s.priority    the priority level that is assigned to the SLA s.

--- skillDelay(q) is the time after which the skill level matching is lifted for a call placed on queue q.

A weighting scheme is also used to represent the relative strength of the various priority levels, s.priority. W(s.priority) is preferably an integer that represents the weight of priority level s.priority. Preferably, the weight of the high priority level, W(1), is ten times larger than the weight of the medium priority level, W(2), which is in turn ten times larger than the weight of the low priority level, W(3). That is, W(1)=100, W(2)=10 and W(3)=1. It is understood that other weighting schemes and values can be used.

The principle of the SLO method is to consider each SLA constraint s as an active object, to which an energy E(s) is associated. The energy E(s) provides a statistical means for defining efficiencies of the call center in meeting specifically defined objectives. Examples of such objectives include service level agreements, throughput of queues, and throughput of agents. The SLO method can then use the determined energy values to dynamically re-route calls within the ACD and improve the efficiency of the call center. The energy E(s) is defined by a score which is determined using the following formula:

$$E(s) = [f(r(s), s.\text{rate}+C) + q.\text{size}/D] * W(s.\text{priority}) \quad (1)$$

The higher the score of E(s), the worse the performance of the call center in meeting the SLA s. In general, E(s) is low if the SLA s is being satisfied, but E(s) is high if the SLA s is not being satisfied.

The energy of each SLA s is a product of the weight given to the priority level of this SLA s, W(s.priority), and the sum of the size of the queue to which the SLA s is associated, q.size, and a function f of the target rate, s.rate, and a dynamic satisfaction rate, r(s). A first portion of equation 1, f(r(s), s.rate+C), enables the SLO method to focus on queues that include SLAs that are not being met. A second portion of equation 1, q.size/D, enables the SLO method to focus on queues that include too many call events, that is, queues that have become too large and are therefore operating below efficiency expectations. C is a constant used for fine-tuning and is selected to overshoot the given target goal, s.rate. Preferably, C=3. D is also a constant used for fine-tuning. The value of D is dependent on the size of the call center. D is a means of weighting the relative importance of the queue size. Preferably, D=10. The function f provides a satisfaction value resulting from the comparison of the target rate to the satisfaction rate. Determination of the satisfaction value using the function f is described in greater detail below.

The dynamic satisfaction rate, r(s), is also referred to as a current rate. In determining the satisfaction rate r(s) it is important to evaluate calls that have already been answered and calls that are still in the queue waiting to be answered. The word "answered" in this context preferably refers to a call being picked-up, or received, by an agent. It is understood that in an alternative context, "answered" can refer to the call being resolved, the termination of the call, or some other measure. Some calls in the queue may have only just recently arrived into the ACD; however, other calls may have been waiting for so long that those calls are already late. Late calls are those calls that have already exceeded the pick-up time defined by the associated SLA constraint. Late calls still in the queue will ultimately reduce the satisfaction rate r(s) and therefore need to be accounted for. The dynamic satisfaction rate is computed according to the following:

$$r(s) = [(X+Y)/Z] * 100 \quad (2)$$

where $$X = |\{e \in E | e.\text{queue} = s.\text{queue} \wedge e.\text{pick} \in [t-A, t] \\ \wedge e.\text{pick} \leq e.\text{date} + s.\text{delay}\}|. \quad (3)$$

$$Y = |\{e \in s.\text{queue} | t \leq e.\text{date} + s.\text{delay}\}|. \quad (4)$$

$$Z = |\{e \in E | e.\text{queue} = s.\text{queue} \wedge e.\text{pick} \in [t-A, t]\}| + |s.\text{queue}|. \quad (5)$$

A is measured in seconds, and r(s) is a rolling rate representative of the last A seconds. In general, X, Y and Z each represent a number of events that meet a defined condition. Specifically, X is the number of events on a specified queue that within the last A seconds were answered within the allotted time frame as defined by an SLA associated with the queue. In other words, since r(s) is the satisfaction rate for a specific SLA s, and since the SLA s is associated with a specific queue, s.queue, X is the number of events on s.queue that within the last A seconds were answered on time. In particular, X is the number of call events e, where e is a member of all call events that have occurred, E, such that the queue on which the call event e was placed, e.queue, is the queue, s.queue, associated with the SLA s for which the satisfaction rate r(s) is determined. Furthermore, the call event e must have been answered within the last A seconds, that is e.pick must be between a current time t and t−A seconds ago. Also, the call event e must have been answered within the time constraint defined by the SLA s, that is e.pick must be earlier than or equal to the time that the call event e arrived into the ACD, e.date, plus the time constraint of the SLA s, s.delay. Summarily, X is the number of calls associated with a particular SLA that were answered on time, within the last A seconds.

Y is the number of call events on the specified queue that have yet to be answered but can still be answered on time to meet the SLA constraint. In particular, Y is the number of call events e, where call event e is a member of all events on the queue s.queue, such that the current time t is earlier than or equal to the time that the call event e arrived into the ACD, e.date, plus the time constraint of the SLA s, s.delay. Summarily, Y is the number of calls associated with the particular SLA that are still in the queue and can still be answered on time.

Z is the total number of call events that have been answered on a particular queue within the last A seconds plus the total number of calls still in the particular queue. In particular, Z is the number of call events e, where e is a member of all call events that have occurred, E, such that the queue on which the call event e was placed, is the queue, s.queue, associated with the SLA s for which the satisfaction rate r(s) is determined. Furthermore, the call event e must have been answered within the last A seconds, that is e.pick must be between a current time t and t−A seconds ago. Z also includes the number of call events e that are currently in the queue s.queue.

Once the satisfaction rate r(s) is determined, a value of the function f(r(s), s.rate+C) can be determined. The function f is a non-linear, non-continuous function that includes a rating technique for the satisfaction rate r(s). The function f is defined as:

$$f(a,b)=(100+|a-b|), \text{ for } a \leq b \quad (6)$$

$$f(a,b)=(|a-b|)/20, \text{ for } a > b \quad (7)$$

Comparing equations 6 and 7 with equation 1, it follows that a=r(s) and b=s.rate+C. The function f produces a score based on the difference between the current rate and the target rate. Equation 6 is used when the current rate is less than or equal to the target rate. Equation 7 is used when the current rate is greater than the target rate. Optimally, the current rate equals the target rate. If the current rate is less than the target rate, then the function yields a higher score. Recall that when calculating the energy value E(s) for a given SLA s, a lower score is better than higher score. However, it is not desirable for the current rate to be greater than the target rate since this condition signifies an excess of resources, which is an excessive cost. Therefore, if the current rate is higher than the target rate, then the function also yields a higher score.

FIG. 1 illustrates a conventional function for scoring a comparison between a current rate and a target rate. As can be seen in FIG. 1, the lowest score is obtained when the current rate equals the target rate. The function illustrated in FIG. 1 is continuous and "V-shaped" such that the score increases equally whether the current rate is higher or lower than the target rate.

Figure 2:
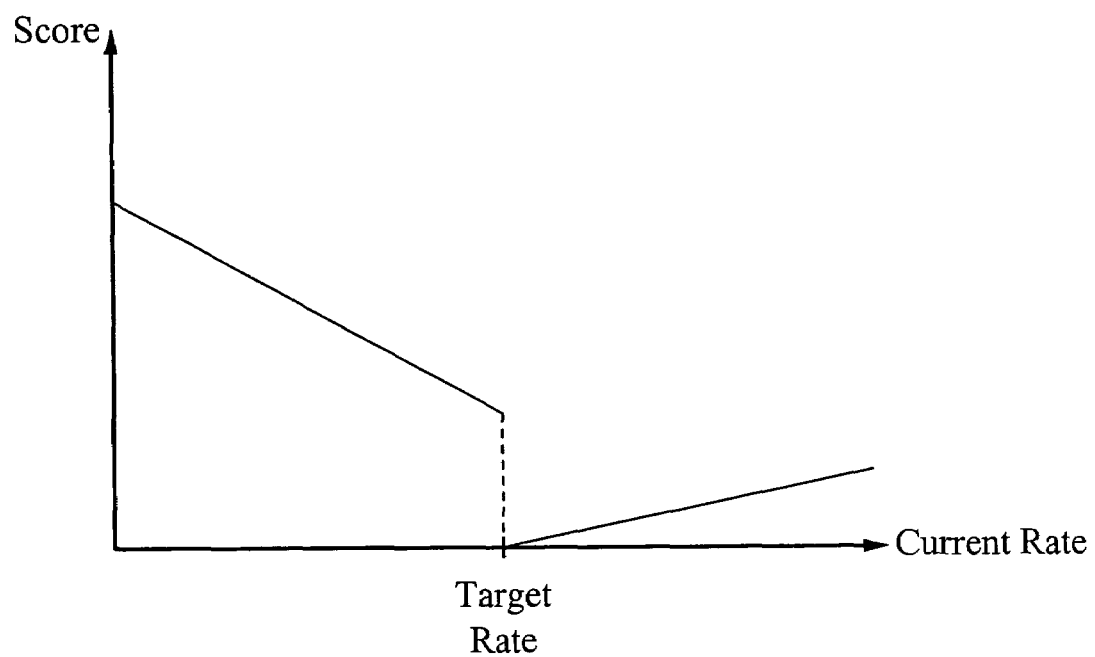
FIG. 2 illustrates a function for scoring a comparison between a current rate and a target rate according to the preferred embodiment of the present invention.

FIG. 2 illustrates a function for scoring a comparison between a current rate and a target rate according to the preferred embodiment of the present invention. The function in FIG. 2 includes a discontinuity between scores where the current rate is less than the target rate and where the current rate equals the target rate. Also, the score increases at a lower rate as the current rate is larger than the target rate, as compared to the rate as the current rate is smaller than the target rate. The discontinuity and the reduced slope of the score for current rate larger than target rate is advantageous to improving the efficiency of the SLO method of the present invention. It is understood that the slopes of the function illustrated in FIG. 2 are for illustrative purposes only, and that the actual slopes can be different than that shown in FIG. 2.

The energy associated with each SLA s, E(s), can be used to derive an energy value for queues and for agents. Since each SLA is associated to a specific queue, the energy value of a queue can be calculated by adding together all of the energy levels for each SLA associated with that queue. In other words, the energy for each queue q, E(q), is the sum of all energies associated with the SLAs in that queue q.

Similarly, the energy value of each agent a can be calculated. The energy of each agent a, E(a), is the sum of all energies of the queues on which the agent a can answer calls. In this manner, the importance of each agent can be determined. The higher the energy of the agent, the more important that agent is within the call center.

The SLO method of the present invention receives one of three types of API events from the ACD: an agent is free, a new call event has arrived in the ACD, or a call event previously placed in a queue has exceeded a predetermined time limit. In response to these API events, the SLO method replies in one of four ways: assign an agent to a given call on a queue, assign the call to a given free agent, place the new call event in a queue, or place the new call event on hold. To place the new call event on hold, the new call is placed in a queue and a wake-up time is associated to it.

When a new call event is received by the ACD, the ACD first determines the type of call event and its priority level. For example, the call event is a telephone call and the caller is a VIP customer. Preferably, the priority level is determined by identifying the originator of the call event. Such identification can be made using any type of conventional identification technique. Based on the call type and the priority level, the call event is assigned an appropriate queue. As calls are processed by the ACD, the energy values for each SLA s, E(s), each queue q, E(q), and each agent a, E(a) are dynamically calculated to be current at any given time. Calls are routed based on the calculated current energy values.

Figure 3:
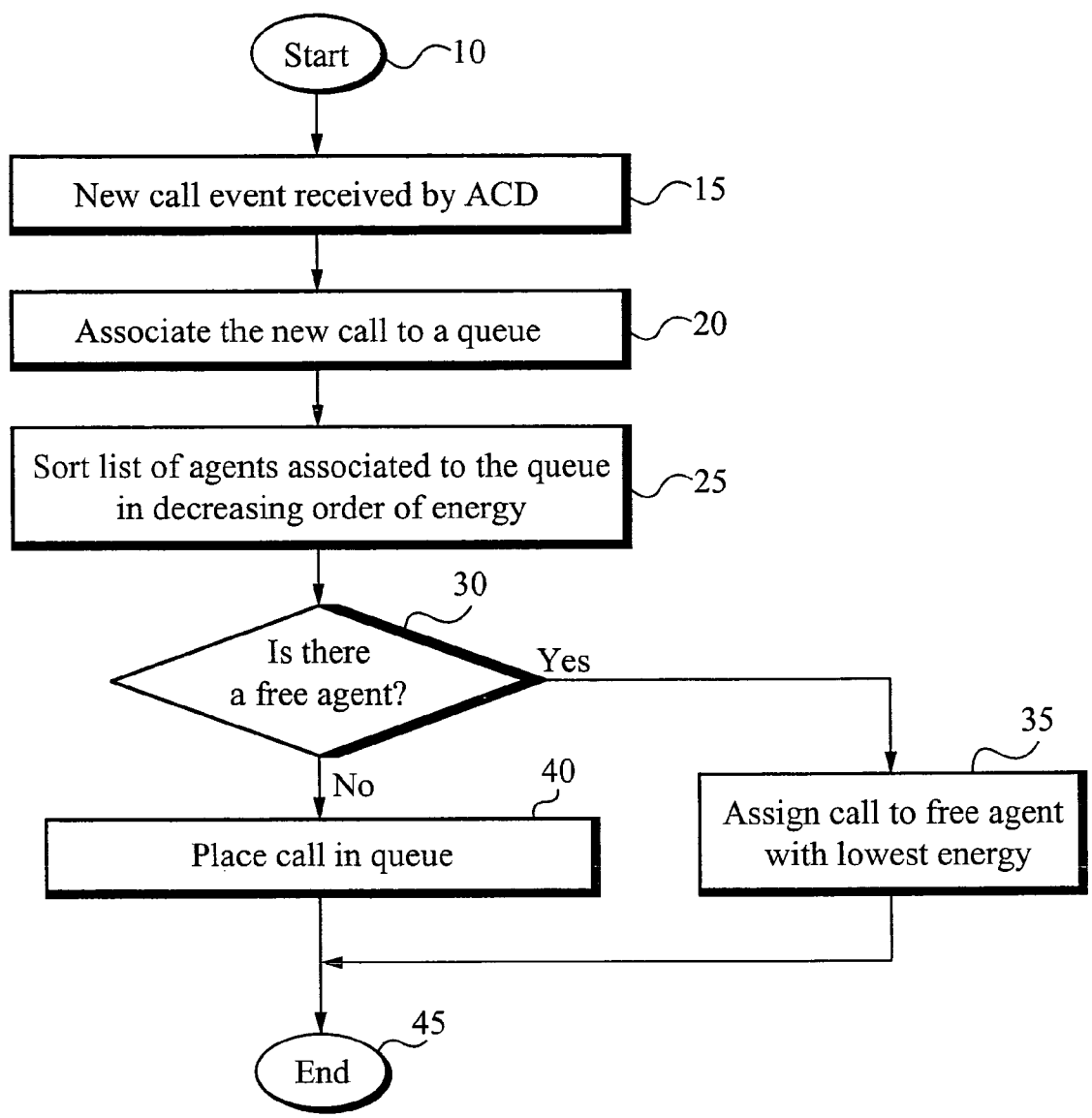
FIG. 3 illustrates a method of handling a newly received call event according to the preferred embodiment of the present invention.

FIG. 3 illustrates a method of handling a newly received call event according to the preferred embodiment of the present invention. The preferred method starts at step 10. At step 15, a new call event is received by an ACD. At step 20, the new call is associated to a queue based on the type of call, such as telephone call or email, and the priority of the call. Once the call is associated to the particular queue, a list of the agents associated to the queue is sorted by increasing order of energy at step 25. In other words, the agent with the least amount of energy is positioned at the top of the list. At step 30, it is determined if there is a free agent associated with the queue. The free agent is one of the agents from the sorted list in step 25. If it is determined that there are one or more free agents at step 30, then at step 35, the new call event is assigned to the free agent with the lowest energy level. If it is determined at step 30 that there are not any free agents, then at step 40, the new call event is placed in the queue. After step 35 or step 40, the method ends at step 45.

Alternatively, instead of placing the new call event in the queue at step 40, the new call event can be placed on hold. To place a call on hold, a hold-time is associated to the call and the call is placed in a hold queue. Preferably, the hold time is the skillDelay of the queue, where the skillDelay is the time after which the skill level matching is lifted for a call placed on queue q. After the hold-time expires, the call in the hold queue is "awakened" and it is determined if there is a free agent to receive the call, as in step 30. If it is determined that there is one or more free agents, then the call is assigned to the free agent with the lowest energy level. If it is determined that there are no free agents, then the call can be placed back on hold, or the call can be placed in the queue, as in step 40.

Figure 4:
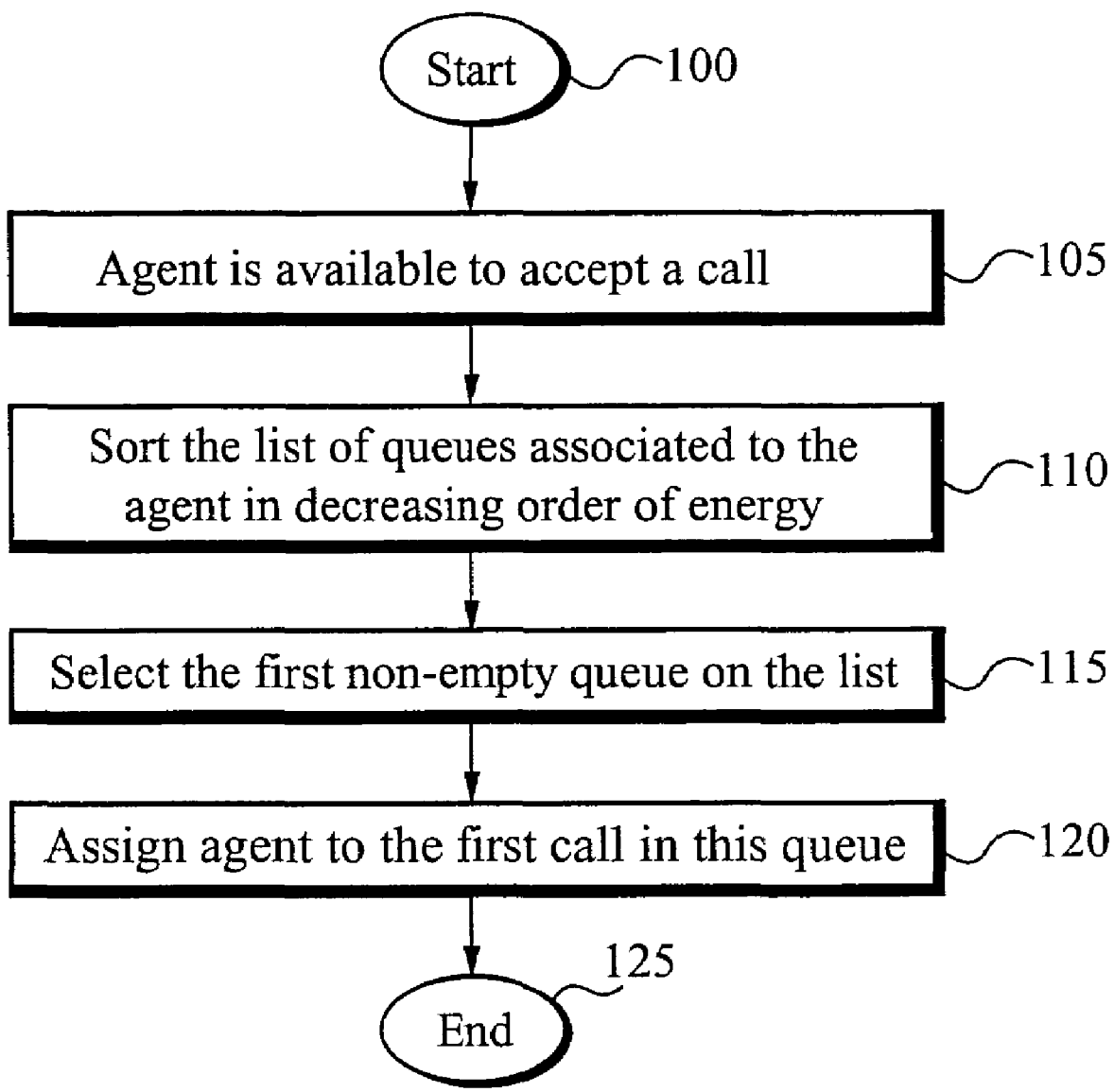
FIG. 4 illustrates a method of assigning a newly freed agent to a call according to the preferred embodiment of the present invention.

FIG. 4 illustrates a method of assigning a newly freed agent to a call according to the preferred embodiment of the present invention. The preferred method starts at step 100. At step 105, an agent becomes available to accept a call. To determine which call the agent is to service, a list of queues associated with the agent is sorted in decreasing order of energy at step 110. Recall that each agent is assigned to one or more queues based on their individual skill levels. At step 115, the first non-empty queue on the sorted list is selected. In other words, the queue with the highest energy is selected. At step 120, the agent is assigned to the first call in the selected queue. Alternatively, if call priority is taken into account, the agent can be assigned to a call within the selected queue that minimizes a combination of delay and priority weight. At step 125, the method ends.

It is understood that the energy levels can be calculated such that the lower the energy level, the worse the performance of the call center. In this alternative case, the embodiments of the SLO method described herein would still prioritize based on worst to best as described above, but the worst case is now the lowest energy level.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiment chosen for illustration without departing from the spirit and scope of the invention.

What is claimed:

1. A method comprising:
   a. determining a current rate of satisfying a service level agreement constraint, wherein the service level agreement constraint is associated to selected ones of each incoming contact within a contact center;
   b. comparing the current rate to a target rate associated with the service level agreement constraint to calculate a satisfaction value;
   c. measuring a size of a queue associated with the service level agreement constraint; and
   d. calculating a potential value associated with the service level agreement constraint based on the satisfaction value, the queue size and a weighted priority level associated with the service level agreement constraint.

2. The method according to claim 1 wherein the contact center includes one or more agents and one or more queues such that each service level agreement constraint is associated to one of the queues, and each agent is associated with one or more of the queues.

3. The method according to claim 2 wherein a skill level is associated to each agent for each queue, a skill level is associated to each call, and a skill constraint is associated to each queue such that each call is answered by an agent with skill level equal to or greater than the skill level associated with the call.

4. The method according to claim 3 wherein after a predetermined time frame, if the call is not answered by an agent, then the skill constraint associated with the call is by-passed.

5. The method according to claim 2 further comprising:
   e. calculating a potential value associated with one of the one or more queues by summing the potential values of all service level agreement constraints associated with the queue.

6. The method according to claim 5 further comprising:
   f. signaling that an agent is available;
   g. sorting a list of queues associated with the available agent according to the potential energies of the queues;
   h. selecting a non-empty queue with the highest potential energy from the list; and
   i. routing a first contact in the selected queue to the available agent.

7. The method according to claim 6 wherein the first contact is determined by which contact arrived in the selected queue first.

8. The method according to claim 6 wherein the first contact is determined by selecting a contact from the selected queue that minimizes a combination of delay and a contact priority weight.

9. The method according to claim 5 further comprising:
   f. calculating a potential value associated with one of the one or more agents by summing the potential values of all queues associated with the agent.

10. The method according to claim 9 further comprising:
    g. associating a new incoming contact to a queue;
    h. sorting a list of agents associated to the queue according to the potential energies of the agents; and
    i. routing the contact to an available agent on the list with the lowest potential energy.

11. The method according to claim 10 further comprising:
    j. routing the contact to the queue if no agents on the list are available.

12. The method according to claim 10 further comprising:
    j. placing the contact on hold and associating a wake-up time to the contact;
    k. awakening the contact after the wake-up time has elapsed; and
    l. routing the contact to an available agent with the lowest potential energy.

13. The method according to claim 1 wherein the satisfaction value is calculated by a discontinuous functional relationship between the current rate and the target rate.

14. The method according to claim 13 wherein the functional relationship is defined by:

$$f(a,b)=(100+|a-b|), \text{ for } a \leq b$$

$$f(a,b)=(|a-b|)/20, \text{ for } a \leq b$$

where a is the current rate and b is the target rate plus a tuning factor.

15. The method according to claim 1 wherein the current rate is determined by calculating the ratio of the sum of all contacts associated with the service level agreement constraint that were picked-up within a given past time frame and that satisfied the service level agreement constraint plus the sum of all contacts in the queue associated with the service level agreement constraint that can still satisfy the service level agreement constraint, and the sum of all contacts associated with the service level agreement constraint that were picked-up within the given past time frame plus the sum of all contacts in the queue associated with the service level agreement constraint.

16. The method according to claim 15 wherein the potential value associated with the service level agreement constraint is calculated by multiplying the weighted priority level associated with the contact and the sum of the queue size divided by a tuning factor plus the satisfaction value.

17. The method according to claim 1 wherein the service level agreement constraint for each contact is satisfied when the agent receives the contact within a predetermined pick-up time.

18. The method according to claim 1 wherein the queue size defines the number of contacts within the queue that have yet to be picked-up by an agent associated with the queue.

19. The method according to claim 1 wherein the contact is one of a telephone call, a video call, an email, a chat message, and an instant message.

20. The method according to claim 1 wherein the service level agreement constraint includes a pick-up time and the target rate.

21. A routing system for routing a contact to an available agent, the routing system comprises:
   a. one or more agents;
   b. one or more queues, wherein each agent is associated with one or more queues; and
   c. an automatic call distributor configured to determine a current rate of satisfying a service level agreement constraint, wherein the service level agreement constraint is associated to selected ones of each incoming contact within a contact center, compare the current rate to a target rate associated with the service level agreement constraint to calculate a satisfaction value, measure a size of a queue associated with the service level agreement constraint, calculate a potential value associated with the service level agreement constraint based on the satisfaction value, the queue size and a weighted priority level associated with the service level agreement constraint, calculate a potential value associated with one of the one or more queues by summing the potential values of all service level agreement constraints associated with the queue, sort a list of queues associated with the available agent according to the potential energies of the queues, select a non-empty queue with the highest potential energy from the list, and route a first contact in the selected queue to the available agent.

22. The routing system according to claim 21 wherein a skill level is associated to each agent for each queue, a skill level is associated to each call, and a skill constraint is associated to each queue such that each call is answered by an agent with skill level equal to or greater than the skill level associated with the call.

23. The routing system according to claim 22 wherein after a predetermined time frame, if the call is not answered by an agent, then the skill constraint associated with the call is by-passed.

24. The routing system according to claim 21 wherein the first contact is determined by which contact arrived in the selected queue first.

25. The routing system according to claim 21 wherein the first contact is determined by selecting a contact from the selected queue that minimizes a combination of delay and a contact priority weight.

26. The routing system according to claim 21 wherein the satisfaction value is calculated by a discontinuous functional relationship between the current rate and the target rate.

27. The routing system according to claim 26 wherein the functional relationship is defined by:

$$f(a,b)=(100+|a-b|), \text{ for } a \leq b$$

$$f(a,b)=(|a-b|)/20, \text{ for } a > b$$

where a is the current rate and b is the target rate plus a tuning factor.

28. The routing system according to claim 21 wherein the current rate is determined by calculating the ratio of the sum of all contacts associated with the service level agreement constraint that were picked-up within a given past time frame and that satisfied the service level agreement constraint plus the sum of all contacts in the queue associated with the service level agreement constraint that can still satisfy the service level agreement constraint, and the sum of all contacts associated with the service level agreement constraint that were picked-up within the given past time frame plus the sum of all contacts in the queue associated with the service level agreement constraint.

29. The routing system according to claim 28 wherein the potential value associated with the service level agreement constraint is calculated by multiplying the weighted priority level associated with the contact and the sum of the queue size divided by a tuning factor plus the satisfaction value.

30. The routing system according to claim 21 wherein the contact is one of a telephone call, a video call, an email, a chat message, and an instant message.

31. The routing system according to claim 21 wherein the service level agreement constraint includes a pick-up time and the target rate.

32. A routing system for routing a contact within a contact center, the routing system comprising:
   a. one or more agents;
   b. one or more queues, wherein each agent is associated with one or more queues; and
   c. an automatic call distributor configured to determine a current rate of satisfying a service level agreement constraint, wherein the service level agreement constraint is associated to selected ones of each incoming contact within a contact center, compare the current rate to a target rate associated with the service level agreement constraint to calculate a satisfaction value, measure a size of a queue associated with the service level agreement constraint, calculate a potential value associated with the service level agreement constraint based on the satisfaction value, the queue size and a weighted priority level associated with the service level agreement constraint, calculate a potential value associated with one of the one or more queues by summing the potential values of all service level agreement constraints associated with the queue, calculate a potential value associated with one of the one or more agents by summing the potential values of all queues associated with the agent, associate a new incoming contact to a queue, sort a list of agents associated to the queue according to the potential energies of the agents, and route the contact to an available agent on the list with the lowest potential energy.

33. The routing system according to claim 32 wherein the automatic call distributor is further configured to route the contact to the queue if no agents on the list are available.

34. The routing system according to claim 32 wherein the automatic call distributor is further configured to place the contact on hold and associating a wake-up time to the contact, awaken the contact after the wake-up time has elapsed, and route the contact to an available agent with the lowest potential energy.

35. The routing system according to claim 32 wherein the satisfaction value is calculated by a discontinuous functional relationship between the current rate and the target rate.

36. The routing system according to claim 35 wherein the functional relationship is defined by:

$$f(a,b)=(100+|a-b|), \text{ for } a \leq b$$

$$f(a,b)=(|a-b|)/20, \text{ for } a > b$$

where a is the current rate and b is the target rate plus a tuning factor.

37. The routing system according to claim 32 wherein the current rate is determined by calculating the ratio of the sum of all contacts associated with the service level agreement constraint that were picked-up within a given past time frame and that satisfied the service level agreement constraint plus the sum of all contacts in the queue associated with the service level agreement constraint that can still satisfy the service level agreement constraint, and the sum of all contacts associated with the service level agreement constraint that were picked-up within the given past time frame plus the sum of all contacts in the queue associated with the service level agreement constraint.

38. The routing system according to claim 37 wherein the potential value associated with the service level agreement constraint is calculated by multiplying the weighted priority level associated with the contact and the sum of the queue size divided by a tuning factor plus the satisfaction value.

39. The routing system according to claim 32 wherein the contact is one of a telephone call, a video call, an email, a chat message, and an instant message.

40. The routing system according to claim 32 wherein the service level agreement constraint includes a pick-up time and the target rate.

* * * * *